US012676087B2

(12) United States Patent
Tanishima et al.

(10) Patent No.: US 12,676,087 B2
(45) Date of Patent: Jul. 7, 2026

(54) PLASTIC LABEL

(71) Applicant: Fuji Seal International, Inc., Osaka (JP)

(72) Inventors: Daisuke Tanishima, Osaka (JP); Masafumi Harada, Osaka (JP); Yo Matsuoka, Osaka (JP)

(73) Assignee: Fuji Seal International, Inc., Osaka (JP)

( * ) Notice: Subject to any disclaimer, the term of this patent is extended or adjusted under 35 U.S.C. 154(b) by 0 days.

(21) Appl. No.: 18/996,132

(22) PCT Filed: Jul. 21, 2023

(86) PCT No.: PCT/JP2023/026710
§ 371 (c)(1),
(2) Date: Jan. 17, 2025

(87) PCT Pub. No.: WO2024/034354
PCT Pub. Date: Feb. 15, 2024

(65) Prior Publication Data

US 2026/0018085 A1 Jan. 15, 2026

(30) Foreign Application Priority Data

Aug. 9, 2022 (JP) ................................ 2022-126789

(51) Int. Cl.
*G09F 3/02* (2006.01)
*B65B 3/04* (2006.01)
(Continued)

(52) U.S. Cl.
CPC .................. *G09F 3/02* (2013.01); *B65B 3/04* (2013.01); *B65C 3/08* (2013.01); *B65D 25/205* (2013.01);
(Continued)

(58) Field of Classification Search
CPC ............... G09F 3/02; G09F 2003/0258; G09F 2003/0272; B65B 3/04; B65C 3/08; B65D 25/205
See application file for complete search history.

(56) References Cited

U.S. PATENT DOCUMENTS 5,456,970 A * 10/1995 Itoh ...................... G03G 7/0053 428/206
2002/0050319 A1* 5/2002 Nishizawa ................ G09F 3/04 428/41.5
(Continued)

FOREIGN PATENT DOCUMENTS

JP H08276566 A * 10/1996
JP H0958120 A * 3/1997
(Continued)

OTHER PUBLICATIONS

International Search Report mailed Sep. 26, 2023, issued for PCT/JP2023/026710 and English translation thereof.
(Continued)

*Primary Examiner* — Lucas E. A. Palmer
(74) *Attorney, Agent, or Firm* — Troutman Pepper Locke LLP

(57) ABSTRACT

To provide a plastic label having a sufficient antistatic property even when the plastic label has a printed layer formed from an aqueous ink. A plastic label including: a printed layer on one surface of a label base material including a plastic film; and an antistatic layer on the other surface thereof, wherein the printed layer is a printed layer formed from an aqueous ink, the antistatic layer contains an antistatic agent, and the antistatic layer has a surface resistivity of less than $1.0 \times 10^{12} \Omega/\square$ under an atmosphere of 25° C. and 50% relative humidity after the printed layer and the antistatic layer are held in contact with each other at 0.025 MPa for 96 hours.

8 Claims, 3 Drawing Sheets

(51) Int. Cl.
*B65C 3/08* (2006.01)
*B65D 25/20* (2006.01)

(52) U.S. Cl.
CPC ................ *G09F 2003/0258* (2013.01); *G09F 2003/0272* (2013.01)

(56) References Cited

U.S. PATENT DOCUMENTS

| | | | | |
|---|---|---|---|---|
| 2003/0059564 A1* | 3/2003 | Ogino | G09F 3/02 428/40.1 |
| 2004/0043176 A1* | 3/2004 | Ogino | G03G 7/004 428/40.1 |
| 2005/0191449 A1* | 9/2005 | Funato | B32B 7/06 428/40.1 |
| 2005/0238834 A1* | 10/2005 | Bourdelais | G03C 11/14 428/40.1 |
| 2007/0196600 A1* | 8/2007 | Hutchinson | G09F 3/02 428/34.1 |
| 2015/0210045 A1* | 7/2015 | Koike | B32B 27/34 156/273.1 |
| 2016/0193814 A1* | 7/2016 | Koike | B32B 7/00 428/411.1 |

FOREIGN PATENT DOCUMENTS

| | | | | | |
|---|---|---|---|---|---|
| JP | 2001049203 A | * | 2/2001 | |
| JP | 2001-271022 A | | 10/2001 | |
| JP | 2004139067 A | * | 5/2004 | |
| JP | 2006187949 A | * | 7/2006 | |
| JP | 2010-083532 A | | 4/2010 | |
| JP | 2013-231137 A | | 11/2013 | |
| JP | 2016-142840 A | | 8/2016 | |
| JP | 2017132874 A | * | 8/2017 | |
| JP | 2022-055745 A | | 4/2022 | |
| KR | 20210038688 A | * | 4/2021 | G09F 3/10 |
| WO | WO-0162514 A2 | * | 8/2001 | D06P 5/003 |

OTHER PUBLICATIONS

Written Opinion of International Searching Authority mailed Sep. 26, 2023, issued for PCT/JP2023/026710 and English translation thereof.

* cited by examiner

PLASTIC LABEL

TECHNICAL FIELD

The present invention relates to a plastic label.

BACKGROUND ART

A so-called heat-shrinkable label using a heat-shrinkable film is used for a container made of glass, plastic, metal, or the like for a beverage/alcoholic beverage, a food seasoning, a pharmaceutical, a cosmetic, or the like. Since the beat-shrinkable label is required to have printability and heat shrinkability, it is known to use a solvent-based printing ink. Further, printing using an aqueous ink excellent in environmental suitability is also known (Patent Document 1).

When a packaged beverage product or the like is manufactured, for example, a finished product is obtained through a process in which containers are aligned at regular intervals and supplied to a manufacturing line, the supplied containers are filled with a product liquid, and then the containers are capped. When labeled containers (particularly, lightweight containers of 30 g or less) are used in the above-described process, the containers before being filled with the product liquid are attracted to or stuck to each other due to static electricity of the labels, resulting in misalignment of the containers supplied to the manufacturing line. As a result, the containers cannot be appropriately filled with the product liquid, problematically (hereinafter referred to as "conveyance failure").

In addition, there is a problem that when one label is cut from a label raw material, the label cannot be fed in predetermined dimensions due to static electricity of the label, which causes a cutting deviation (hereinafter referred to as "deviation in label cutting"), and a problem that when the cut label is fed to the next step (for example, attaching the label to a container), the label does not slip and is jammed (hereinafter referred to as "jamming in label cutting"). In order to avoid these problems, an antistatic layer containing an antistatic agent such as a surfactant has been provided on the surface of the label base material opposite to the surface on which the printed layer is present, in some cases.

CITATION LIST

Patent Document

Patent Document 1: JP 2001-271022 A

SUMMARY OF INVENTION

Technical Problem

However, the plastic label having a printed layer formed from an aqueous ink has a problem of an antistatic property deteriorated with time.

The present invention has been made under such circumstances, and an object thereof is to provide a plastic label having a sufficient antistatic property even when the plastic label has a printed layer formed from an aqueous ink.

The present inventors have investigated causes of the problem that the antistatic property is deteriorated with time in a plastic label having a printed layer formed from an aqueous ink. Then, the present inventors have presumed that one of the causes is that the raw material for the plastic label is manufactured as a roll body in which the raw material is wound, in a roll shape, around an outer periphery of a winding core (also referred to as a "core"), and is stored and transported in a state of the roll body. More specifically, when the plastic label is produced as a roll body, the printed layer and the antistatic layer of the plastic label are in contact with each other for a long period of time under a certain degree of pressure, and the antistatic agent contained in the anastatic layer moves to (dissolves in) the printed layer formed from an aqueous ink. As a result, it is presumed that one of the causes of the above problem is that the function of the antistatic layer is deteriorated. The present invention has solved the problem that the antistatic property is deteriorated with time by coping with the cause based on such presumption.

Solution to Problem

As a result of intensive studies to achieve the above object, the present inventors have found that even in a plastic label having a printed layer formed from an aqueous ink on one surface of a label base material, the plastic label has a sufficient antistatic property by setting a surface resistivity of an antistatic layer within a specific range under specific conditions. The present invention has been completed based on these findings.

That is, the present invention provides a plastic label including: a printed layer on one surface of a label base material including a plastic film; and an antistatic layer on the other surface thereof, wherein the printed layer is a printed layer formed from an aqueous ink, the antistatic layer contains an antistatic agent, and the antistatic layer has a surface resistivity of less than $1.0\times10^{12}\Omega/\square$ under an atmosphere of 25° C. and 50% relative humidity after the printed layer and the antistatic layer are held in contact with each other at 0.025 MPa for 96 hours.

The antistatic agent preferably contains an alkyl ammonium chloride.

The number of carbon atoms in the molecule of the alkyl ammonium chloride is preferably from 8 to 30.

The aqueous ink preferably contains an acrylic aqueous resin or a urethane-based aqueous resin.

The present invention also provides a labeled container including the plastic label and a container body, wherein the container body has a weight of 30 g or less, and the label is attached to the container body.

The present invention also provides a method for manufacturing a labeled container, the method including: preparing the plastic label; attaching the label to a container body; and filling a content into the container body to which the label is attached.

Advantageous Effects of Invention

The plastic label of the present invention has the above configuration, and thus exhibits a sufficient antistatic property. Therefore, an adherend such as a container to which the plastic label of the present invention is attached is hardly charged, and an attractive force due to static electricity between adherends is hardly generated. Therefore, even if the adherend is a light container, it is possible to prevent conveyance failure due to static electricity. Further, it is possible to avoid problems such as deviation and jamming in label cutting.

DESCRIPTION OF EMBODIMENTS

The plastic label of the present invention has a printed layer on one surface of a label base material including a plastic film and an antistatic layer on the other surface thereof. The printed layer is a printed layer formed from an aqueous ink, and the antistatic layer contains an antistatic agent. The plastic label of the present invention may include a layer other than the label base material, the printed layer, and the antistatic layer (hereinafter, sometimes referred to as "additional layer") as long as the effects of the present invention are not impaired.

The plastic label of the present invention is characterized in that the antistatic layer has a surface resistivity (hereinafter, sometimes referred to as "post-test surface resistivity") of less than $1.0\times10^{12}\Omega/\square$ under an atmosphere of 25° C. and 50% relative humidity after the printed layer and the antistatic layer are held in contact with each other at 0.025 MPa for 96 hours. The post-test surface resistivity is not particularly limited as long as it is less than $1.0\times10^{12}\Omega/\square$, but is, for example, preferably $1.0\times10^{11}\Omega/\square$ or less, more preferably $1.0\times10^{10.5}\Omega/\square$ or less, still more preferably $1.0\times10^{10.2}\Omega/\square$ or less, and particularly preferably $1.0\times10^{9.8}\Omega/\square$ or less. The lower limit of the surface resistivity is not particularly limited, and is, for example, $1.0\times10^{3}$ $\Omega/\square$. When the surface resistivity falls within the above range, there is a tendency that a decrease in antistatic property is less likely to occur. In the present specification, the surface resistivity can be measured in accordance with JIS K 6911.

In the plastic label of the present invention, the surface resistivity of the antistatic layer (hereinafter sometimes referred to as "pre-test surface resistivity") is not particularly limited, but is, for example, preferably $1.0\times10^{11}\Omega/\square$ or less, more preferably $1.0\times10^{10.5}\Omega/\square$ or less, and still more preferably $1.0\times10^{10}\Omega/\square$ or less under an atmosphere of 25° C. and 50% relative humidity. The lower limit of the surface resistivity is not particularly limited, and is, for example, $1.0\times10^{3}\Omega/\square$. When the surface resistivity falls within the above range, the antistatic property tends to be good.

In the plastic label of the present invention, a ratio of the post-test surface resistivity to the pre-test surface resistivity ("post-test surface resistivity"/"pre-test surface resistivity") is not particularly limited and is, for example, from $1.0\times10^{0.1}$ to $1.0\times10^{3.0}\Omega/\square$. When the ratio falls within the above range, there is a tendency that a decrease in antistatic property is less likely to occur.

Figure 1:
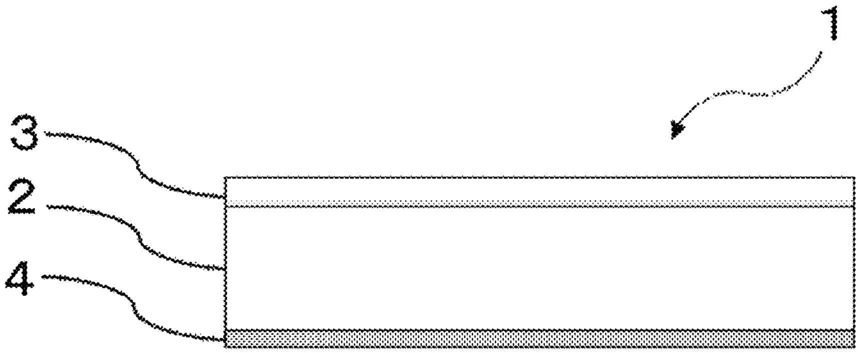
FIG. 1 is a schematic view showing an embodiment of a plastic label of the present invention.

FIG. 1 is a schematic view (partial cross-sectional view) showing an embodiment of the plastic label of the present invention. A plastic label 1 of the present invention shown in FIG. 1 has a label base material 2 including a plastic film, a printed layer 3, and an antistatic layer 4. In the plastic label 1 of the present invention shown in FIG. 1, the printed layer 3 is provided on one surface of the label base material 2. The antistatic layer 4 is provided on the surface opposite to the surface of the label base material 2 on which the printed layer 3 is provided.

Printed Layer

The printed layer (for example, the printed layer 3 in FIG. 1) is a printed layer formed from an aqueous ink. More specifically, the printed layer is formed by applying the aqueous ink to one surface of the label base material and removing a part or all of volatile components in the aqueous ink by drying (drying and solidification). If necessary, curing may be performed after the application and drying (drying and solidification). Examples of the printed layer include a design printed layer (e.g., a color printed layer) of a figure and/or a design such as a trade name, an illustration, and/or handling precautions, a back-printed layer formed in a single color such as white, a primer printed layer provided for enhancing adhesion between the label base material and the printed layer, and a protective printed layer for protecting the design printed layer. The design printed layer includes an illustration and/or handling precautions, and thus is preferably protected by a protective printed layer for preventing dissolution and disappearance by chemical components. The printed layer may be a single layer or may be multilayered. That is, the application and drying of the aqueous ink are performed once or a plurality of times, and a printed layer which is a single layer or is multilayered is formed. When the printed layer is multilayered, the printed layers constituting the multilayered printed layer may be of the same type or may be a combination of different types (for example, a design printed layer and a back-printed layer, a design printed layer and a protective printed layer, or a back-printed layer and a protective printed layer).

In the plastic label of the present invention, the layer providing a front surface of one side is preferably the printed layer. Here, the "layer providing the front surface" can be rephrased as the outermost surface of the plastic label.

The aqueous ink preferably contains an aqueous resin, water, and a water-miscible organic solvent (e.g., an alcohol such as methanol, ethanol, n-propyl alcohol, or isopropyl alcohol). Examples of the aqueous resin include resins used in known or commonly used aqueous inks. Examples of the aqueous resin include resins having water solubility (water-soluble resins) and resin emulsions. The aqueous resin functions as a binder resin in the printed layer.

The content of the aqueous resin in the printed layer is not particularly limited, but is preferably 50 wt. % or more, more preferably 60 wt. % or more, and still more preferably 70 wt. % or more based on a total weight (100 wt. %) of the printed layer. When the content is 50 wt. % or more, adhesion to the label base material is good, which is preferable.

Examples of the aqueous resin include an acrylic aqueous resin, a urethane-based aqueous resin, and an epoxy-based aqueous resin. The aqueous resin is preferably an acrylic aqueous resin from the viewpoint of improving the antistatic property.

The water-soluble resin is not particularly limited as long as it can be dissolved in water. Examples of the water-soluble resin include resins having a hydrophilic group. Examples of the hydrophilic group include anionic hydrophilic groups such as a carboxyl group, a phosphoric acid ester group, and a sulfonic acid group; cationic hydrophilic groups such as an amino group, an imino group, a quaternary ammonium salt group, and a tertiary sulfonium salt group; and nonionic hydrophilic groups such as a hydroxyl group, an ether group, and an amide group.

Examples of the water-soluble resin include a water-soluble acrylic-based resin, a water-soluble urethane-based resin, and a water-soluble epoxy-based resin. Examples of such a water-soluble resin include the above-described urethane-based resin having a hydrophilic group, the above-described epoxy-based resin having a hydrophilic group, and the above-described acrylic-based resin having a hydrophilic group.

As the resin emulsion, emulsions of various thermoplastic resins can be used, and examples thereof include vinyl acetate-based resin emulsions, acrylic-based resin emulsions, vinyl chloride-based resin emulsions, polyolefin-based resin emulsions (such as polyethylene-based resin emulsions), urethane-based resin emulsions, epoxy-based resin emulsions, and polyester-based resin emulsions.

The resin emulsion is not particularly limited, and may be of a forced emulsification type in which a surfactant is used as an emulsifier, or of a self-emulsification type in which a hydrophilic group (for example, the hydrophilic group in the water-soluble resin described above) is introduced into a resin.

Examples of the acrylic-based aqueous resin include the above-described acrylic-based resin having a hydrophilic group, which is a water-soluble resin, and the above-described acrylic-based resin emulsion, which is a resin emulsion. From the viewpoint of improving the antistatic property, the acrylic-based aqueous resin is preferably an acrylic-based resin emulsion.

Examples of the acrylic-based resin include a polymer composed of an acrylic monomer as an essential monomer component, that is, a polymer (copolymer) having at least a constituent unit derived from an acrylic monomer. As the monomer component constituting the acrylic-based resin described above, a monomer component other than the acrylic monomer may be contained.

Examples of the acrylic monomer include (meth)acrylic acid alkyl esters having a linear or branched alkyl group, such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, hexyl (meth)acrylate, octyl (meth)acrylate, 2-ethylhexyl (meth)acrylate, isononyl (meth)acrylate, decyl (meth)acrylate, and dodecyl (meth)acrylate [preferably (meth)acrylic acid C1-12 alkyl esters etc.]; (meth)acrylic acid; carboxyl group-containing (meth)acrylic acid esters, such as carboxyethyl acrylate; hydroxyl group-containing (meth)acrylic acid esters, such as 2-hydroxymethyl (meth) acrylate, 2-hydroxyethyl (meth)acrylate, 2-hydroxypropyl (meth)acrylate, 3-hydroxypropyl (meth)acrylate, 6-hydroxyhexyl (meth)acrylate, diethylene glycol mono (meth) acrylate and dipropylene glycol mono (meth)acrylate [preferably hydroxy (meth)acrylate C1-8 alkyl ester etc.]; (meth) acrylic acid cycloalkyl esters, such as cyclohexyl (meth) acrylate and isobornyl (meth)acrylate; (meth)acrylic acid amide derivatives, such as N-methylol (meth) acrylamide, N-butoxymethyl (meth)acrylamide, N,N-dimethyl (meth) acrylamide, and N,N-diethyl (meth)acrylamide; and monomers including a (meth)acryloyl group (monomers including at least an acryloyl group or a methacryloyl group), such as (meth)acrylic acid dialkylaminoalkyl esters, such as dimethylaminoethyl (meth)acrylate, diethylatninoethyl (meth) acrylate, dipropylaminoethyl (meth)acrylate, dimethylaminopropyl (meth)acrylate, and dipropylaminopropyl (meth) acrylate. Only one type, or two or more types, of the acrylic monomer may be used.

The monomer component constituting the acrylic-based resin, other than the acrylic monomer, is not particularly limited, and examples thereof include carboxyl group-containing polymerizable unsaturated compounds such as crotonic acid, itaconic acid, fumaric acid and maleic acid, and anhydrides thereof; styrene compounds such as styrene, vinyltoluene and α-methylstyrene; vinyl esters such as vinyl acetate and vinyl propionate; vinyl halides such as vinyl chloride; vinyl ethers such as methyl vinyl ether; cyano group-containing vinyl compounds such as (meth) acrylonitrile; and ethylene and propylene.

Examples of the urethane-based aqueous resin include urethane-based aqueous resins (self-emulsification type aqueous urethane-based resins) having a hydrophilic group introduced into the molecule, such as an ionomer type, a bisulfite type, and a nonionic type; and urethane-based aqueous resins (forced emulsification type aqueous urethane-based resins) obtained by forcibly emulsifying a polymerized urethane-based resin (or prepolymer) in the presence of an emulsifier, such as a polymer emulsification type, a block isocyanate type, or a prepolymer emulsification type.

The urethane-based resin is not particularly limited, and a known or commonly used polyurethane resin for a printed layer or a printing ink can be used, and examples thereof include a resin obtained by reacting a polyisocyanate compound with a polyol compound.

The polyisocyanate compound is, for example, one type or a mixture of two or more types of known aromatic, aliphatic or alicyclic diisocyanate(s). Examples of the diisocyanate include tolylene diisocyanate, 4,4-diphenylmethane diisocyanate, 1,3-phenylene diisocyanate, hexamethylene diisocyanate, xylylene diisocyanate, 1,5-naphthalene diisocyanate, and isophorone diisocyanate. If necessary, a tri- or higher functional polyisocyanate or polyisocyanate adduct can be used as a mixture with the diisocyanate.

As the polyol compound, there can be used: low-molecular-weight glycols such as ethylene glycol, diethylene glycol, 1,3-propanediol, propylene glycol (1,2-propanediol), butanediol (1,3-butanediol, 1,4-butanediol, etc.), 1,6-hexanediol and cyclohexanedimethanol; polyether diols such as polyethylene glycol, polypropylene glycol, polytetramethylene glycol, and polytetramethylene glycol-polycaprolactone copolymer; polyester diols obtained from diols such as propylene glycol, butanediol, and hexanediol and diprotic acids such as adipic acid, sebacic acid, azelaic acid, isophthalic acid, terephthalic acid, and fumaric acid; and known diols including lactone diols such as polycaprolactone diol, polyvalerolactone diol, and lactone block copolymer diol. If necessary, the above-described diol may be used in combination with a tri- or higher functional polyol compound (e.g., polyether polyol or polyester polyol).

Examples of the epoxy-based aqueous resin include an epoxy-based aqueous resin in which a polymerized epoxy-based resin is dispersed by an emulsifier in water which may contain an organic solvent (external emulsification type aqueous epoxy-based resin) and an epoxy-based aqueous resin obtained by modifying a polymerized epoxy-based resin (self-emulsification type aqueous epoxy-based resin).

Among them, the aqueous resin is preferably an acrylic-based resin emulsion, a urethane-based resin emulsion, a polyester-based resin emulsion, a polyolefin-based resin emulsion, a water-soluble acrylic-based resin, or a water-soluble urethane-based resin.

The aqueous ink may be curable (for example, active energy ray-curable, heat-curable, two component reaction-curable, or moisture-curable). That is, the printed layer may be a printed layer formed by curing a curable composition layer formed from an aqueous ink having curability.

The aqueous ink may contain a component (additive) other than the aqueous resin, water, and water-miscible organic solvent as long as the effects of the present invention are not impaired. The additive is not particularly limited, and examples thereof include a curing agent, an emulsifier, a water-immiscible organic solvent, a surfactant, a wax, a silicone-based compound, a colorant (a color pigment, a fluorescent pigment, a dye, or the like), a plasticizer, a lubricant, an anti-settling agent, a dispersant, a stabilizer, an antifoaming agent, a filler, an antioxidant, an ultraviolet absorber, a color separation inhibitor, a perfume, and a deodorant. Only one type, or two or more types, of the additive may be used.

Examples of the water-immiscible organic solvent include esters such as acetic acid esters (e.g., ethyl acetate, propyl acetate, and butyl acetate); aromatic hydrocarbons such as toluene and xylene; aliphatic hydrocarbons such as hexane and octane; and alicyclic hydrocarbons such as cyclohexane and methylcyclohexane.

The content of the aqueous resin in the aqueous ink is not particularly limited, but is preferably 50 wt. % or more, more preferably 60 wt. % or more, and still more preferably 70 wt. % or more, based on a total weight (100 wt. %) of nonvolatile components of the aqueous ink. When the content is 50 wt. % or more, adhesion to the label base material is good, which is preferable. The upper limit of the content is not particularly limited and may be 100 wt. %. When the aqueous ink contains a colorant, the contents of the colorant and the aqueous resin are not particularly limited, but, more preferably, the colorant is contained in an amount of from 5 to 50 wt. % and the aqueous resin is contained in an amount of from 50 to 95 wt. % based on the total weight (100 wt. %) of the nonvolatile components of the aqueous ink. On the other hand, when the printed layer does not contain a colorant, the content of the aqueous resin is not particularly limited, but is more preferably 80 wt. % or more, and still more preferably 90 wt. % or more based on the total weight (100 wt. %) of the nonvolatile components of the aqueous ink.

The content of the nonvolatile component (for example, aqueous resin) in the aqueous ink is not particularly limited, but is preferably from 30 to 70 wt. % based on a total weight (100 wt. %) of the aqueous ink.

The content of the volatile components (for example, water and a water-miscible organic solvent) in the aqueous ink is not particularly limited, but is preferably from 30 to 70 wt. % based on the total weight (100 wt. %) of the aqueous ink.

The aqueous ink is manufactured, for example, by mixing the aqueous resin, water, and, if necessary, a water-miscible organic solvent, additives, and the like. The mixing can be performed by a known or commonly-used mixing method, and is not particularly limited. For example, a mixer such as a paint shaker, a butterfly mixer, a planetary mixer, a pony mixer, a dissolver, a tank mixer, a homomixer, or a homodisper, a mill such as a roll mill, a sand mill, a hall mill, a bead mill, or a line mill, or a mixing device such as a kneader is used. The mixing time (residence time) during the mixing is not particularly limited, but is preferably from 10 to 120 minutes. The obtained aqueous ink may be used after being filtered, if necessary. Only one type, or two or more types, of each of the above components (aqueous resin, alcohol, and other additives) may be used.

Antistatic Layer

The antistatic layer (e.g., antistatic layer 4 in FIG. 1) contains an antistatic agent. The plastic label of the present invention has the antistatic layer, and thus exhibits an excellent antistatic property. The antistatic layer may be formed by applying a composition containing an antistatic agent onto the surface of the label base material opposite to the surface having the printed layer, and removing a part or all of volatile components in the composition by drying (drying and solidification). If necessary, curing may be performed after the application and drying (drying and solidification). The antistatic layer may be a single layer or may be multilayered. That is, the application and drying of the composition containing the antistatic agent are performed once or a plurality of times, and an antistatic layer which is a single layer or is multilayered is formed. When the antistatic layer is multilayered, the antistatic agents contained in the compositions constituting the multilayered antistatic layer may be of the same type or of different types depending on the layer to be formed. In the plastic label of the present invention, the antistatic layer is preferably a layer providing the front surface of the other side.

The content of the antistatic agent in the antistatic layer is not particularly limited, but is preferably from 50 to 100 wt. %, more preferably from 80 to 100 wt. %, still more preferably from 90 to 100 wt. %, and particularly preferably from 98 to 100 wt. % based on a total weight (100 wt. %) of the antistatic layer.

The antistatic agent is not particularly limited, and known or commonly used antistatic agents can be used.

Examples of the antistatic agent include cationic antistatic agents, anionic antistatic agents, amphoteric antistatic agents, and nonionic antistatic agents. These antistatic agents may be used alone, or two or more types thereof may be used in combination.

The antistatic agent preferably contains a cationic antistatic agent such as a primary amine salt, a secondary amine salt, a tertiary amine salt, a fatty acid amide amine salt, a quaternary ammonium salt, an alkyltrialkylene glycol ammonium salt, an alkyl ether ammonium salt, a benzalkonium salt, a benzethonium salt, a pyridinium salt, or an imidazolinium salt, more preferably contains a quaternary ammonium salt, and still more preferably contains an alkyl ammonium chloride, from the viewpoint that a high antistatic property can be imparted to the plastic label.

Examples of the alkyl ammonium chloride include compounds represented by the following formula (1).

[Chem. 1]

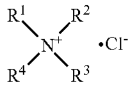

(1)

In the formula (1), $R^1$ to $R^4$ are the same or different and each represent hydrogen or a monovalent organic group. However, at least one of $R^1$ to $R^4$ is an alkyl group. In addition, among $R^1$ to $R^4$, the number of carbon atoms in the monovalent organic group having the largest number of carbon atoms is preferably from 10 to 20.

Examples of the monovalent organic group include a hydrocarbon group and a heterocyclic group. Examples of the hydrocarbon group include alkyl groups (for example, an alkyl group having from 1 to 20 carbon atoms is preferable, and an alkyl group having from 1 to 18 carbon atoms is more preferable) such as a methyl group, an ethyl group, a propyl group, an isopropyl group, a butyl group, a pentyl group, a hexyl group, a heptyl group, an octyl group, a nonyl group, and a decyl group; alkylene groups (for example, an alkylene group having from 1 to 20 carbon atoms is preferable, and an alkylene group having from 1 to 18 carbon atoms is more preferable) such as a methylene group, an ethylene group, and a propylene group; cycloalkyl groups such as a cyclopentyl group, a cyclohexyl group, a cyclooctyl group, an adamantyl group, and a norbornyl group; aryl groups such as a phenyl group; aralkyl groups such as a benzyl group; and groups in which two or more of these groups are bonded. Examples of the heterocyclic group include 5- to 10-membered heterocycloalkyl groups and heteroaryl groups containing at least one heteroatom selected from the group consisting of a nitrogen atom, an oxygen atom, and a sulfur atom.

In the compound represented by the formula (1), from the viewpoint of improving the antistatic property, it is preferable that any one of $R^1$ to $R^4$ is an alkyl group or alkylene group having from 10 to 20 carbon atoms and that the remaining three are each hydrogen or an alkyl group or alkylene group having from 1 to 5 carbon atoms, and it is more preferable that any one of $R^1$ to $R^4$ is an alkyl group having from 10 to 20 carbon atoms and the remaining three are each hydrogen or an alkyl group having from 1 to 5 carbon atoms. In addition, all of $R^1$ to $R^4$ are preferably alkyl groups.

The number of carbon atoms in the molecule of the alkyl ammonium chloride is not particularly limited, but is preferably from 8 to 30, and more preferably from 10 to 25, for example. When the alkyl ammonium chloride is the compound represented by the formula (1), the number of carbon atoms in the molecule is a total number of carbon atoms in $R^1$ to $R^4$, and the total number is preferably from 8 to 30, more preferably from 10 to 25. When the number of carbon atoms in the molecule falls within the above range, the plastic label tends to exhibit a sufficient antistatic property.

The composition containing the antistatic agent may contain a binder resin (for example, an acrylic-based resin, a urethane-based resin, or a polyester-based resin), a solvent, or an additive as a component other than the antistatic agent as long as the effects of the present invention are not impaired. The additive is not particularly limited, and examples thereof include a curing agent, an emulsifier, a surfactant, a wax, a silicone-based compound, a colorant (a color pigment, a fluorescent pigment, a dye, or the like), a plasticizer, a lubricant, an anti-settling agent, a dispersant, a stabilizer, an antifoaming agent, a filler, an antioxidant, an ultraviolet absorber, a color separation inhibitor, a perfume, and a deodorant. Only one type, or two or more types, of the additive may be used.

Examples of the solvent include organic solvents including esters such as acetic acid esters (e.g., ethyl acetate, propyl acetate, and butyl acetate); alcohols such as methanol, ethanol, isopropyl alcohol, propanol, and butanol; ketones such as methyl ethyl ketone and methyl isobutyl ketone; aromatic hydrocarbons such as toluene and xylene; aliphatic hydrocarbons such as hexane and octane; alicyclic hydrocarbons such as cyclohexane and methylcyclohexane; glycols such as ethylene glycol and propylene glycol; glycol ethers such as ethylene glycol monopropyl ether, propylene glycol monomethyl ether, and propylene glycol monobutyl ether, and glycol ether esters such as propylene glycol monomethyl ether acetate.

The content of the antistatic agent in the composition containing the antistatic agent is not particularly limited, but is preferably from 50 to 100 wt. %, more preferably from 80 to 100 wt. %, still more preferably from 90 to 100 wt. %, and particularly preferably from 98 to 100 wt. % based on a total weight (100 wt. %) of nonvolatile components of the composition.

The content of the nonvolatile components (for example, an antistatic agent) in the composition containing the antistatic agent is not particularly limited, but is preferably from 0.01 to 10 wt. %, more preferably from 0.05 to 5 wt. %, and still more preferably from 0.1 to 1 wt. % based on a total weight (100 wt. %) of the composition.

The content of the volatile component (for example, a solvent) in the composition containing the antistatic agent is not particularly limited, but is preferably from 90 to 99.99 wt. %, more preferably from 95 to 99.95 wt. %, and still more preferably from 99 to 99.9 wt. % based on the total weight (100 wt. %) of the composition.

Label Base Material

The label base material (e.g., label base material 2 in FIG. 1) serves as a support for the printed layer and the antistatic layer and has a major influence on the strength, stiffness and shrinkage characteristic of the label.

The label base material includes at least a plastic film. The type of plastic film can be appropriately selected according to the type of plastic label, and the like, and is not particularly limited. For example, when the plastic label of the present invention is a shrink label (heat-shrinkable label), the plastic film is a shrink film (heat-shrinkable film). When the plastic label of the present invention is a stretch label, the plastic film is a stretch film. When the plastic label of the present invention is a tack label, a roll label, or an in-mold label, the plastic film may be a heat-shrinkable film or a non-shrinkable film. Among them, the plastic film is preferably a heat-shrinkable film.

The type of resin forming the plastic film can be appropriately selected depending on the required physical properties, application, cost, and the like, and is not particularly limited, and examples thereof include resins such as polyester-based resins, polyolefin-based resins (for example, a polyethylene-based resin and a polypropylene-based resin), polystyrene-based resins, polyvinyl chloride resins, polyamide resins, and acrylic-based resins. Only one type, or two or more types, of the resin may be used. Further, resins of the same type or different types may be laminated, and a laminated film may be used. For example, the plastic film is preferably a polyester-based film containing a polyester-based resin as a main component, a polyolefin-based film containing a polyolefin-based resin as a main component, or a heterogeneous laminated film including an outer layer made of a polyester-based resin and an inner layer made of a polyolefin-based resin or polystyrene-based resin. As the polyester-based resin, polyolefin-based resin and polystyrene-based resin, for example, polyester-based resins and polyolefin-based resins described in JP 2008-170822 A, JP 2008-170697 A, JP 2008-163215 A, and JP 2008-163231 A can be used. When the plastic film is a stretch film, a polyolefin-based film is preferable.

Examples of the polyester-based resin used in the polyester-based film include a polyethylene terephthalate (PET)-based resin, poly(ethylene-2,6-naphthalene dicarboxylate) (PEN), and polylactic acid (PLA). Among them, a polyethylene terephthalate (PET)-based resin is preferable. Examples of the PET-based resin include polyethylene terephthalate (PET) using terephthalic acid as a dicarboxylic acid component and ethylene glycol as a diol component; diol-modified PET such as copolyester (CHDM-copolymerized PET) using terephthalic acid as a dicarboxylic acid component, and using ethylene glycol as a main component and 1,4-cyclohexanedimethanol (CHDM) as a copolymerization component as a dicarboxylic acid, copolyester (NPG-copolymerized PET) using terephthalic acid as a dicarboxylic acid component, and using ethylene glycol as a diol component as a main component and neopentyl glycol (NPG) as a copolymerization component as a diol component, and copolyester using dicarboxylic acid as a dicarboxylic acid component, and using ethylene glycol as a main component and diethylene glycol as a copolymerization component as a diol component; and dicarboxylic acid-modified PET such as copolyester using terephthalic acid as a main component and isophthalic acid and/or adipic acid as a copolymerization component as a dicarboxylic acid component, and using ethylene glycol as a diol component.

Examples of the polystyrene-based resin used in the heterogeneous laminated film include resins containing one or more styrene-based monomers such as styrene, α-methylstyrene, m-methylstyrene, p-methylstyrene, p-ethylstyrene, p-isobutylstyrene, p-t-butylstyrene, and chloromethylstyrene as constituent monomers. Specific examples of the resin include general-purpose polystyrene (GPPS), styrene-butadiene copolymer (e.g., SBS), a styrene-butadiene-isoprene copolymer (SBIS), and a styrene-acrylic acid ester copolymer.

Examples of the polyolefin-based resin used in the polyolefin-based film include polyethylene-based resins such as low-density polyethylene (LDPE), linear low-density polyethylene (LLDPE), metallocene catalyst-based LLDPE (mLLDPE), and ethylene-vinyl acetate copolymer; polypropylene-based resins such as polypropylene and propylene-α-olefin copolymer; and cyclic olefin resins. In particular, as the polyolefin-based film, a film including an outer layer made of a cyclic olefin resin is preferable, and for example, a film having an outer layer made of a cyclic olefin resin and an inner layer (central layer) made of a polyethylene-based resin or polypropylene-based resin is preferable.

The plastic film may have a single-layer structure or a laminated structure. That is, the plastic film may be a single-layer film, or may be a laminated film in which a plurality of film layers are laminated depending on the required physical properties, applications, and the like. In the case of a laminated film, film layers composed of the same type of resin may be laminated, or film layers composed of different resins may be laminated. In the case of a laminated film, a laminated film including an outer layer made of a polyester-based resin and an inner layer made of a polyolefin-based resin or polystyrene-based resin, or a laminated film including an outer layer made of a cyclic olefin resin and an inner layer made of a polyethylene resin or polypropylene-based resin is preferable.

The plastic film may be a non-oriented film or an oriented film. In particular, when the plastic film is a heat-shrinkable film, it is preferably a film oriented in at least one direction (for example, a film oriented in one direction, or a film oriented in one direction and a direction different from the one direction) from the viewpoint of exhibiting a shrink characteristic (heat shrinkability). When the heat-shrinkable film is a laminated film, it is preferable that at least one film layer in the laminated film is oriented, and it is preferable that all film layers are oriented in at least one direction. When all the film layers are non-oriented, a sufficient shrink characteristic may not be exhibited. As the heat-shrinkable film, particularly, a film oriented in one direction (uniaxially oriented film) or a film oriented in one direction and a direction orthogonal to the one direction (biaxially oriented film) is often used, and among them, a uniaxially oriented film (including a film mainly stretched in one direction, slightly stretched in a direction orthogonal to the one direction, and substantially stretched in one direction) is generally used. When the plastic film is a stretch film, it may be a non-oriented film, but may be slightly oriented (for example, oriented by stretching less than 1.5 times). When the plastic film is a non-shrinkable film, it may be a non-oriented film, may be slightly oriented (for example, oriented by stretching less than 1.5 times), or may be a biaxially oriented film, but a biaxially oriented film is most generally used.

The film oriented in at least one direction is obtained by stretching an unstretched film in at least one direction. For example, when the film oriented in at least one direction is a uniaxially oriented film, the film is obtained by stretching an unstretched film in one direction, and when the film is a biaxially oriented film, the film is obtained by stretching an unstretched film in one direction and a direction orthogonal to the one direction. The shrink label can be heat-shrunk mainly in the orientation direction of the heat-shrinkable film.

The plastic film can be prepared by a commonly used method such as melt film formation or solution film formation. It is also possible to use a commercially available plastic film. When a plastic film having a laminated structure is prepared, a commonly used method such as a co-extrusion method or a dry lamination method can be used as a lamination method. The plastic film may be oriented by a method of, for example, stretching in two directions, i.e., a longitudinal direction (film manufacturing line direction; sometimes referred to as machine direction or MD direction) and a width direction (direction orthogonal to the longitudinal direction; also referred to as transverse direction or TD direction), or stretching in one direction (longitudinal direction or width direction). As the stretching method, for example, a roll method, a tenter method, a tube method, or the like can be used. For example, the stretching treatment of the film stretched substantially in one direction in the width direction can be performed at a temperature of about from 70 to 100° C. by stretching the film, for example, about from 1.01 to 1.5 times, preferably about from 1.05 to 1.3 times in the longitudinal direction, and then stretching the film about from 3 to 8 times, preferably about from 4 to 7 times in the width direction, as necessary.

When the plastic film is a heat-shrinkable film, a heat shrinkage rate of the heat-shrinkable film in a main shrinkage direction at 90° C. for 10 seconds (sometimes referred to as "heat shrinkage rate (90° C., 10 sec)") is not particularly limited, but is preferably from 30 to 90%, and more preferably from 40 to 85%. The heat shrinkage rate (90° C., 10 sec) of the heat-shrinkable film in a direction orthogonal to the main shrinkage direction is not particularly limited, but is preferably from −3 to 15%. The above-described "main shrinkage direction" is a direction in which the heat shrinkage rate is the largest, and is generally a direction in which the stretching treatment is mainly performed, and for example, in the case of a film stretched substantially in one direction in the width direction, the main shrinkage direction is the width direction.

When the plastic film is a non-shrinkable film, the heat shrinkage rate (90° C. 10 sec) of the plastic film is not particularly limited, but preferably does not exceed 5% in any direction.

When the plastic film is a stretch film, it is preferable that the stretch film can be stretched 1.25 times or more in at least one direction, and that a strain of the stretch film after being stretched 1.25 times is 10% or less when a length of the stretch film before being stretched 1.25 times is 100%. The strain can be measured using, for example, a known or commonly used tensile tester. Examples of the tensile tester include "Shimadzu Autograph (AGS-50G: load cell type 500N)" available from Shimadzu Corporation. JIS K 7161 can be referred to, as necessary, for test conditions and the like.

As the plastic film used as the label base material, a commercially available product can also be used. Examples of the heat-shrinkable film include “Space Clean S7042” and “SV-808” available from Toyobo Co., Ltd., “LX-10S”, “LX-18S” and “LX-61S” available from Mitsubishi Chemical Corporation (these are polyester-based films); “Bonset” available from C. I. Kasei Co., Ltd. and “GMLS” available from Gunze Ltd. (these are polystyrene-based films); “FL” available from Gunze Ltd. (polyolefin-based film); “Ecoloju” available from Mitsubishi Chemical Corporation (polylactic acid-based film); “DL” available from Mitsubishi Chemical Corporation and “HGS” available from Gunze Ltd. (these are laminated films including a surface layer made of a polyester-based resin and a central layer made of a polystyrene-based film). Examples of the stretch film include “Suzulon-L” available from Aicello Chemical Co., Ltd. Examples of the non-shrinkable film include “OP” and “FOS” available from Mitsui Chemicals Tohcello. Inc., and “Torayfan” available from Toray Industries, Inc. (these are biaxially oriented polypropylene films).

The surface of the plastic film may be subjected to a commonly used surface treatment such as a corona discharge treatment, a primer treatment, or an antistatic coating treatment, if necessary.

When the plastic film is transparent, a haze value of the plastic film [in accordance with JIS K 7136, in terms of a thickness of 40 μm, unit; %] is not particularly limited, but is preferably 10% or less, more preferably 7% or less, and still more preferably 5% or less. In the case where the haze value exceeds 10%, in an application of a plastic label (back-printed plastic label) in which printing is applied to an inner side of a label base material (container-facing surface side when the plastic label is attached to a container) and the printing is seen through the label base material, the printing may become cloudy, resulting in deterioration in decorativeness, when the product is obtained. However, even if the haze value exceeds 10%, the label may be opaque in applications other than the above-described application in which printing is seen through the label base material (front-printed plastic label), and is sufficiently usable. In addition, the plastic film in the opaque label base material is not particularly limited, and for example, a milky film, a metal-deposited film, or the like can be used.

A thickness of the plastic film is not particularly limited, but is preferably from 10 to 150 μm. In the case of a heat-shrinkable film or a non-shrinkable film, the thickness is preferably from 10 to 100 μm, more preferably from 12 to 80 μm, and still more preferably from 15 to 60 μm. In the case of a stretch film, the thickness is preferably from 50 to 150 μm.

Additional Layer

The additional layer is not particularly limited, and examples thereof include a printed layer other than the printed layer formed from an aqueous ink (for example, a printed layer formed from an oil-based ink), an adhesive layer (such as a pressure-sensitive adhesive layer or a heat-sensitive adhesive layer), an anchor coat layer, a primer coat layer, a coating layer, an inner coat layer, a vapor-deposited layer of a metal or a metal oxide, a light-shielding layer, a heat-insulating layer, a barrier layer, and a slipping layer.

Plastic Label

The plastic label of the present invention may be a front-printed label, a back-printed label, or a duplex-printed label. As used herein, the front-printed label is a label that allows the printing to be seen without passing through the label base material. In other words, it refers to a label in which the design printed layer is provided in front of the label base material when the label is viewed. In addition, the back-printed label is a label that allows the printing to be seen through the label base material, and refers to a label in which the design printed layer is on the back side of the label base material when the label is viewed. The duplex-printed label refers to a label having a design printed layer on both surface sides of a label base material. Hereinafter, the side from which the label is viewed is referred to as a “viewing side”.

When the plastic label of the present invention is a front-printed label, examples of the plastic label include [design printed layer/label base material-antistatic layer], [protective printed layer/design printed layer/label base material/antistatic layer], [design printed layer/primer printed layer/label base material/antistatic layer], and [protective printed layer/design printed layer/primer printed layer/label base material/antistatic layer]. In the present specification, [layer A/layer B/layer C/ . . . ] means a plastic label in which the layers are laminated in this order (layer A, layer B, layer C, . . . ) from the viewing side.

In the above-described plastic label, at least one printed layer has only to be a printed layer formed from an aqueous ink, but the layer providing the front surface is preferably a printed layer formed from an aqueous ink. For example, when the plastic label is [protective printed layer/design printed layer/label base material/antistatic layer], the protective printed layer is preferably a printed layer formed from an aqueous ink.

When the plastic label of the present invention is a back-printed label, examples of the plastic label include [antistatic layer/label base material/design printed layer], [antistatic layer/label base material/primer printed layer/design printed layer], [antistatic layer/label base material/design printed layer/back-printed layer], [antistatic layer/label base material/primer printed layer/design printed layer/back-printed layer], [antistatic layer/label base material/design printed layer/protective printed layer], [antistatic layer/label base material/primer printed layer/design printed layer/protective printed layer], [antistatic layer/label base material/design printed layer/back-printed layer/protective printed layer], and [antistatic layer/label base material/primer printed layer/design printed layer/back-printed layer/protective printed layer].

Also in the above-described plastic label, at least one printed layer has only to be a printed layer formed from an aqueous ink, but the layer providing the front surface is preferably a printed layer formed from an aqueous ink, as is the case with the front-printed label. In the plastic label, in order to make the design in the design printed layer visible, layers (for example, the antistatic layer, the label base material, and the primer printed layer) present up to the design printed layer when viewed from the viewing side are preferably transparent.

When the plastic label of the present invention is a duplex-printed label, examples thereof include [design printed layer/label base material design printed layer/antistatic layer], [design printed layer/label base material/design printed layer/antistatic layer], [protective printed layer/design printed layer/label base material/design printed layer/antistatic layer], [protective printed layer/design printed layer/label base material/design printed layer/antistatic layer]. [antistatic layer/design printed layer/label base material/design printed layer], [antistatic layer/design printed layer/label base material/design printed layer], [antistatic layer/design printed layer/label base material/design printed layer/protective printed layer], and [antistatic layer/design printed layer/label base material/design printed layer/protective printed layer].

Also in the above-described plastic label, at least one printed layer has only to be a printed layer formed from an aqueous ink, but the layer providing the front surface is preferably a printed layer formed from an aqueous ink, as is the case with the front-printed label. In the plastic label, in order to make the design in the design printed layer visible, layers present up to the design printed layer when viewed from the viewing side are preferably transparent.

The plastic label is not particularly limited, and examples thereof include a stretch label, a shrink label (including a stretch shrink label), an in-mold label, a tack label, a roll label (a wrap-around type pasting label), and a heat-sensitive label. Among them, a shrink label, a roll label, and a heat-sensitive label are preferable, and shrink labels are particularly preferable. When the plastic label of the present invention is a shrink label, it is particularly useful because it is stably excellent in resistance to chemical components before and after heat shrinkage.

A thickness (total thickness) of the plastic label is not particularly limited, but is preferably from 10 to 170 μm. In the case of a shrink label, an in-mold label, a roll label, or a heat-sensitive label, the thickness is preferably from 10 to 120 μm, more preferably from 15 to 90 μm, and still more preferably from 20 to 65 μm. In the case of a tack label, the thickness is preferably from 25 to 150 μm. In the case of a stretch label, the thickness is preferably from 50 to 170 μm.

Preferred Embodiment of Plastic Label of Present Invention

A first preferred embodiment of the plastic label of the present invention will be described with reference to FIG. 1. The first embodiment is a shrink label in which, in FIG. 1, the label base material 2 includes a plastic film, the printed layer 3 is a printed layer formed from an aqueous ink, and the antistatic layer 4 contains an antistatic agent. A thickness of the printed layer is not particularly limited, but is preferably from 0.1 to 8 μm, more preferably from 0.3 to 6 μm, and still more preferably from 0.5 to 4 μm. A thickness of the antistatic layer is not particularly limited, but is preferably from 0.1 to 8 μm, more preferably from 0.3 to 6 μm, and still more preferably from 0.5 to 4 μm. The "thickness of the printed layer" means a total thickness when the printed layer is multilayered. When the plastic label of the present invention has two or more types of printed layers, it means a total thickness of all the printed layers. For example, when the plastic label of the present invention includes a design printed layer and a protective printed layer that protects the design printed layer as the printed layers, the total thickness of the printed layers formed by the design printed layer and the protective printed layer corresponds to the "thickness of the printed layer".

In the shrink label shown in FIG. 1, the printed layer 3 may be a design printed layer. The design printed layer is formed by a plurality of printed layers different in color pigment to obtain a desired design. In addition, the design printed layer may be transparent or opaque. In the shrink label, a protective printed layer may be provided on the surface of the label base material 2 so as to cover the design printed layer. Specifically, the protective printed layer may be formed in a region wider than the design printed layer and may be provided so as to cover the entire surface of the design printed layer. The thickness of the protective printed layer is not particularly limited, but is preferably from 0.5 to 10 μm.

The plastic label of the present invention can be used as, for example, a tubular plastic label of the type in which both ends of the label are sealed with a solvent or an adhesive to form a tubular shape and then attached to an adherend (for example, tubular shrink label, tubular stretch label, roll-on shrink-on label (ROSO label)), or a wrap-around type plastic label (wrap-around type shrink label, tack label, heat-sensitive label) in which one end of the label is attached to an adherend with an adhesive or the like, the label is wrapped around the adherend, the other end is overlapped with one end, and a tubular shape is formed. The plastic label of the present invention is particularly preferably used as the tubular plastic label. That is, the plastic label of the present invention is preferably a tubular plastic label. Hereinafter, the tubular plastic label using the plastic label of the present invention is sometimes referred to as "the tubular plastic label of the present invention".

Tubular Plastic Label

The tubular plastic label of the present invention preferably has an antistatic layer on the outermost surface (the surface located outermost when the label is formed into a tubular shape).

Figure 2:
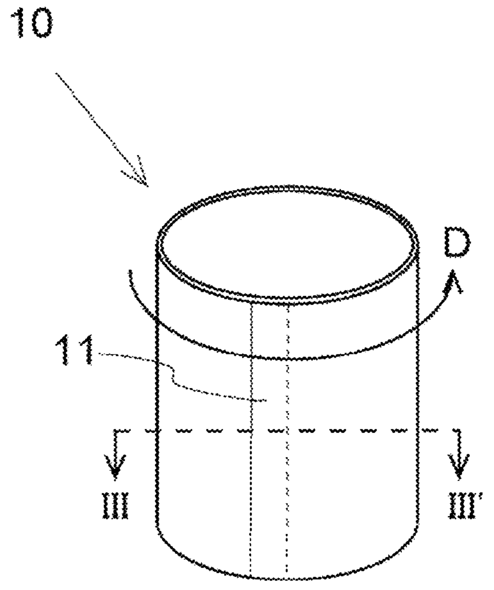
FIG. 2 is a schematic view showing a tubular shrink label which is a preferred embodiment of the plastic label of the present invention.

An example of a tubular shrink label which is a preferred embodiment of the plastic label of the present invention will be described with reference to FIGS. 2 and 3. A tubular shrink label 10 shown in FIG. 2 is a tubular body in which a shrink label including a label base material formed in a rectangular shape, a printed layer, and an antistatic layer is formed in a tubular shape by overlapping the other end portion on the outside of one end portion of the shrink label, and the inner surface of the other end portion and the outer surface of the one end portion are bonded with a solvent or an adhesive to form a seal portion 11. The tubular shrink label 10 is formed into a tubular shape so that the main shrinkage direction of the heat-shrinkable film is a circumferential direction D of the tubular shrink label, and can be heat-shrunk in this direction.

Figure 3:
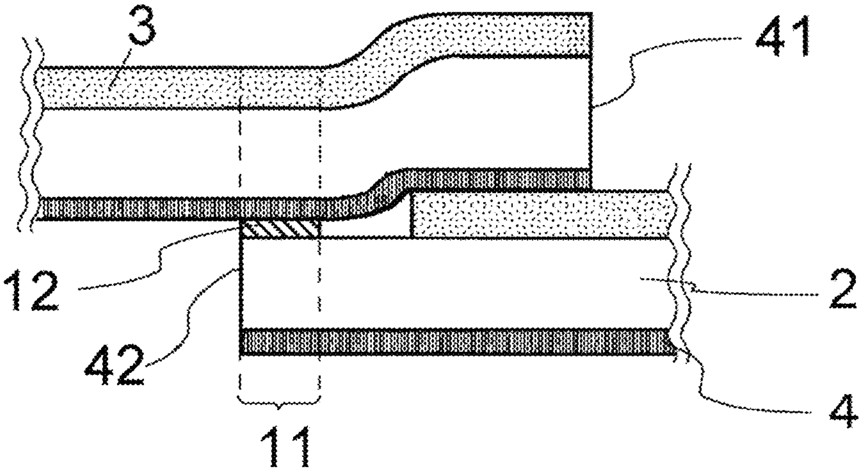
FIG. 3 is a schematic view showing the tubular shrink label which is a preferred embodiment of the plastic label of the present invention (an enlarged view of a main part of a cross section taken along line III-III' in FIG. 2).

FIG. 3 is an enlarged view of a main part of a cross section taken along line III-III' in FIG. 2, i.e., the vicinity of the seal portion 11 of the tubular shrink label 10. Specifically, in the shrink label, the printed layer 3 is formed in a region excluding a region having a predetermined width from an end 42 of the other end portion of one surface (the inner surface of the tubular body) of the label base material 2. Therefore, in the shrink label, the printed layer 3 is not formed in the region having a predetermined width from the end 42 of the other end portion, the label base material 2 is exposed, and a label base material exposed surface is formed. Specifically, the tubular shrink label 10 takes a form in which the label base material exposed surface formed on an inner surface side of the other end portion of the shrink label and the antistatic layer formed on an outer surface side of one end portion are joined by a solvent or adhesive 12. Each of the printed layer 3 and the antistatic layer 4 may be a single layer or may be multilayered. In FIG. 3, the printed layer 3 side when viewed from the label base material 2 indicates the inside of the tubular body, and the antistatic layer 4 side when viewed from the label base material 2 indicates the outside of the tubular body. Therefore, the phrase "viewing side" given above means the "outside of the tubular body" described above, and the sentence that "the label is viewed" given above means that the label is viewed from the outside to the inside of the tubular body. The layer configuration of the tubular shrink label in FIGS. 2 and 3 is not limited to the layer configuration shown in the figures, and may have another layer configuration.

A width of the seal portion is not particularly limited, but is preferably from 0.2 to 10 mm, more preferably from 0.3 to 5 mm, and still more preferably from 0.4 to 2 mm.

In the tubular shrink label 10 as illustrated in FIGS. 2 and 3, the joining form (envelope bonding) in which the inner surface of the other end portion and the outer surface of one end portion are joined as the seal portion 11. However, the joining form in the tubular plastic label of the present invention is not limited to this, and may be a joining form in which the inner surface side surfaces of one end portion and the other end portion or the outer surface side surfaces are overlapped, and the overlapped portions are joined (butted) by heat sealing or the like. Also in this case, the exposed surfaces formed on the inner surface side or the outer surface side are overlapped and joined to each other.

In addition, in the tubular shrink label 10 in FIG. 3, one end portion extends to a position where its end 41 overlaps the printed layer 3 of the other end portion, and a region where the printed layers 3 of the one end portion and the other end portion overlap each other is formed. Therefore, there is no region where no printed layer is present in the thickness direction. The tubular shrink label may have a structure in which the end 41 of one end portion overlaps the printed layer 3 on the other end portion side as shown in FIG. 3, or may have a structure in which the end of one end portion extends to a region overlapping the label base material exposed surface of the other end portion but does not extend to a position overlapping the printed layer 3 on the other end portion side, i.e., the end of one end portion and the printed layer 3 on the other end portion side do not overlap each other.

Methods for Manufacturing and Processing Plastic Label of Present Invention

Examples of the methods for manufacturing and processing the plastic label of the present invention (e.g., the method for manufacturing a tubular plastic label) are shown below.

The method for manufacturing the plastic label of the present invention includes at least forming a printed layer on one surface of a label base material (printed layer formation step) and forming an antistatic layer on the other surface of the label base material (antistatic layer formation step).

Printed Layer Formation Step

In the printed layer formation step, a printed layer is formed by applying an aqueous ink on at least one surface of a label base material and solidifying the aqueous ink by drying, curing, or the like. As a method for applying the aqueous ink, a known and commonly used method can be used, and among them, gravure printing, flexographic printing, and digital printing are preferable. In the case where the printed layer is a design printed layer, at a stage of providing the design printed layer, the application of the aqueous ink is generally performed a plurality of times for each color, and a multilayered printed layer is formed.

When a solvent-drying aqueous ink is used, the printed layer can be formed by applying the aqueous ink to form a coating film, drying and removing the solvent from the coating film, and drying (drying and solidifying) the coating film.

The solvent-drying type aqueous ink is manufactured by, for example, mixing an aqueous resin, water, a water-miscible organic solvent, other additives, and the like as necessary. The mixing can be performed by a known and commonly used mixing method, and is not particularly limited. For example, a mixer such as a paint shaker, a butterfly mixer, a planetary mixer, a pony mixer, a dissolver, a tank mixer, a homomixer, or a homodisper, a mill such as a roll mill, a sand mill, a ball mill, a bead mill, or a line mill, or a mixing device such as a kneader is used. The mixing time (residence time) during the mixing is not particularly limited, but is preferably from 10 to 120 minutes. The obtained aqueous ink may be used after being filtered, if necessary. Only one type of each of the above components may be used, or two or more types thereof may be used.

Antistatic Layer Formation Step

In the antistatic layer formation step, an antistatic layer is formed by applying a composition containing an antistatic agent onto the surface of the label base material opposite to the surface having the printed layer and solidifying the composition by drying or the like.

In the case where the antistatic layer is a solvent-drying type layer, the antistatic layer is formed by applying a composition containing the antistatic agent onto the surface of the label base material, and drying and solidifying the composition as necessary. When the applied composition layer (applied layer) is dried by heating, blowing (for example, cold air, air at room temperature, or warm air), or the like, a general heating device or blowing device capable of drying on a printing apparatus can be preferably used. From the viewpoint of safety and drying efficiency, a hot air heater or the like can be preferably used as the heating device.

As a method for applying the composition, a gravure printing method and a flexographic printing method are preferable from the viewpoints of cost, productivity, and the like, and among them, a gravure printing method is particularly preferable.

The composition is manufactured by mixing a binder resin, a solvent, and additives as needed in addition to the antistatic agent. The mixing can be performed by a known or commonly used mixing method, and is not particularly limited. For example, the mixers illustrated and described as the mixer for the aqueous ink forming the above-described printed layer can be used. The mixing time (residence time) during the mixing is not particularly limited, but is preferably from 10 to 120 minutes. The obtained composition may be used after being filtered, if necessary. Only one type of each of the above components may be used, or two or more types thereof may be used. The solvent can be removed by drying after the composition is applied to the label base material.

The viscosity (23±2° C.) of the composition is not particularly limited, but is, for example, preferably from 10 to 1000 mPa-s, and more preferably from 20 to 500 mPa-s, when the composition is applied by gravure printing.

The plastic label of the present invention can be prepared as described above.

Method for Manufacturing Tubular Plastic Label

The method for manufacturing the tubular plastic label of the present invention is not particularly limited, and is, for example, as follows. A long plastic label of the present invention is slit to a predetermined width to obtain a long label body in which a plurality of the plastic labels of the present invention are connected in a long direction (longitudinal direction). The long label body is formed in a tubular shape by overlapping the inner surface side surfaces of one end portion and the other end portion or the outer surface side surfaces of the long label body so that the width direction (that is, in the width direction of the label base material) is the circumferential direction, the overlapped portion is sealed in a band shape with a predetermined width and both end portions are joined, or the long label body is formed in a tubular shape by overlapping one end portion and the other end portion in a state where the other end portion is on the outer side of the one end portion so that the width direction is the circumferential direction, and the overlapped portions are sealed in a band shape with a predetermined width and both end portions are joined, whereby a long tubular label continuous body (long tubular plastic label) can be obtained. By cutting the long tubular plastic label in the circumferential direction, one tubular plastic label (the tubular plastic label of the present invention) having a predetermined length in a height direction can be obtained.

Labeled Container

For example, in a container including a container body having an opening and a lid capable of sealing the opening, the plastic label of the present invention is attached to the container body, which is used as a plastic labeled container (sometimes referred to as "labeled container"). In particular, the plastic label of the present invention is preferably used by being attached to a container body of a lightweight container described later. However, the plastic label of the present invention may be used for an object to which it is attached (adherend) other than the container body. Examples of the container include bottles for soft drinks, milk bottles for home delivery, containers for foods such as seasonings and cup noodles, bottles for alcoholic beverages, containers for pharmaceuticals, containers for chemical products such as detergents and sprays, and containers for toiletries. The shape of the container body is not particularly limited, and examples thereof include various shapes such as tubular, rectangular and other shape bottle types and cup types. Examples of the material for the container body include, but are not limited to, plastics such as polyethylene terephthalate-based resins and olefin-based resins, glass, and metals. Note that the container may not have a lid, and may be closed by deformation of the opening of the container body, sealing, or the like.

The plastic label of the present invention is effective in preventing conveyance failure particularly when the adherend is a lightweight container. A weight of the container body in the lightweight container is not particularly limited, but is, for example, preferably 30 g or less, more preferably 15 g or less, and still more preferably 10 g or less. In general, when the weight of the container body is light as described above, there is a tendency that problems such as the labeled containers being attracted to each other due to the static electricity of the plastic label frequently occur. However, the container (container body) to which the plastic label of the present invention is attached has a sufficient antistatic property, and thus is effective in that such problems hardly occur. In particular, the above-described effect is remarkably exhibited in the case where the label is attached to the container body in which no content is filled and then a content is filled (in the case of pre-shrink). That is, when the plastic label of the present invention is attached to a container body which is not filled with a content and to which a lid is not attached, problems such as the containers being attracted to each other hardly occur. Therefore, it is possible to prevent conveyance failure of the labeled container (specifically, the container body to which the plastic label is attached).

Method for Manufacturing Labeled Container

The method for manufacturing a labeled container is not particularly limited, and includes, for example, preparing the plastic label of the present invention (preparation step), attaching the label to a container body (label attachment step), and filling the container body to which the label is attached with a content (filling step). In the filling step, the content is filled from the opening of the container body. When a container including a container body having an opening and a lid capable of sealing the opening is used, the method may include attaching the lid to the opening of the container body and sealing the opening after the filling step. In the case of a container having no lid (including a container body having an opening), the step may be closing the opening of the container body by deformation, sealing, or the like after the filling step. In the method for manufacturing a labeled container, attaching the label to the container body not filled with the content (i.e., the container body before being filled with the content) is effective in that when the container is relatively light, the containers are less likely to be attracted to each other due to static electricity of the plastic label to cause a problem of conveyance failure.

The labeled container can be manufactured, for example, through a preparation step of supplying a raw material having a plurality of the plastic labels of the present invention formed in a tubular shape (raw material for the tubular plastic label) to an automatic label attaching apparatus and cutting the raw material into a single label of a predetermined length, and then a label attachment step of fitting the tubular plastic label on the container not filled with the content so as to cover almost the entire surface or a predetermined site of the container side surface and, if necessary, heat-shrinking the label by heating to attach the label.

When the plastic label of the present invention is a shrink label, specifically, for example, the shrink label can be produced by externally fitting a tubular shrink label to a predetermined container, heat-shrinking the tubular shrink label by heat treatment, and following and adhering the tubular shrink label to the container (shrink processing). Examples of the method for the heat treatment include a method of passing the tubular shrink label through a hot air tunnel or a steam tunnel, and a method of heating the tubular shrink label with radiant heat such as infrared rays. In particular, a method of treating with steam at from 80 to 100° C. (passing the tubular shrink label through a heating tunnel filled with steam and hot water) is preferable. Dry steam at from 101 to 140° C. can also be used. The heat treatment is not particularly limited, but is preferably performed in a temperature range in which the temperature of the heat-shrinkable film is from 85 to 100° C. (particularly from 90 to 97° C.). The treatment time of the heat treatment is preferably from 4 to 20 seconds from the viewpoint of productivity and economic efficiency.

On the other hand, when the plastic label of the present invention is a stretch label, specifically, for example, a tubular stretch label having a diameter smaller than the minimum diameter of a portion of the adherend container to which the label is attached is stretched by an external force so as to have a diameter larger than that of the adherend container and externally fitted onto the container, and then the external force is released to cause the tubular stretch label to self-contract so as to follow and adhere the container.

EXAMPLES

Hereinafter, the present invention will be described in more detail based on examples, but the present invention is not limited by these examples. Table 1 shows the configurations and evaluation results of the plastic labels produced in Examples and Comparative Examples.

Example 1

On one side of a film (trade name "BS71L" available from C.I. Takiron Corporation, thickness: 20 μm), an aqueous varnish (aqueous transparent ink using an acrylic aqueous resin) was applied as an aqueous ink using a manual test coater K Lox Proofer (available from RK Print Coat Instruments), dried and solidified, and then subjected to aging treatment at 25±3° C. for 24 hours to form a printed layer.

An antistatic agent A was applied to the surface of the film opposite to the printed layer using a manual test coater K Lox Proofer (available from RK Print Coat Instruments), and dried and solidified to form an antistatic layer.

Examples 2 to 5 and Comparative Examples 1 to 3

A plastic label was obtained in the same manner as in Example 1 except that the antistatic agent and the aqueous ink shown in Table 1 were used.

Evaluation-Container Sticking

A plastic label was shrunk on plastic containers (columnar containers having no irregularities on the surfaces at which the containers were brought into contact with each other) having a weight of about 5 g, and the containers were arranged so that they were brought into contact with each other, and evaluated according to the following criteria. The evaluation results are shown in Table 1.

○: Even though one container is moved, the other container does not move and remains there.

×: When one container is moved, the other container moves together.

TABLE 1

| | | Example 1 | Example 2 | Example 3 | Example 4 | Example 5 | Comparative Example 1 | Comparative Example 2 | Comparative Example 3 |
|---|---|---|---|---|---|---|---|---|---|
| Antistatic agent | | A | A | B | B | C | C | Not used | |
| Aqueous ink | | Aqueous varnish | Aqueous white | Aqueous varnish | Aqueous white | Aqueous varnish | Aqueous white | Aqueous varnish | Aqueous white |
| Surface resistance | Pre-test | 8.7 | 8.6 | 9.1 | 9.2 | 9.9 | 10.0 | 12.2 | 12.2 |
| | Post-test | 9.2 | 10.0 | 9.6 | 10.2 | 10.5 | 12.1 | 13.1 | 13.0 |
| Evaluation | Surface resistance | ◎ | ○ | ◎ | ○ | ○ | × | × | × |
| | Container sticking | ○ | ○ | ○ | ○ | ○ | × | × | × |

Evaluation

The plastic labels obtained in Examples and Comparative Examples were evaluated as follows. The evaluation results are presented in Table 1.

(1) Surface Resistivity (Before Test)

Using a surface resistor (Aspure surface resistance meter YC-103), the surface resistivity of the antistatic layer was measured after the plastic label was humidity-controlled for 30 minutes under an atmosphere of 25° C. and 50% relative humidity. The numerical values of the surface resistivity in Table 1 are expressed using common logarithm (logarithm to the base of 10).

(2) Surface Resistivity (Post-Test)

Two plastic labels were prepared, stacked so that the printed layer of one sample was in contact with the antistatic layer of the other sample, pressed at 0.025 MPa, and held for 96 hours. The surface resistivity of the antistatic layer of the sample after holding (the antistatic layer of the "other sample" described above) was measured using a surface resistor (Aspure surface resistance meter YC-103) after the sample was humidity-controlled for 30 minutes under an atmosphere of 25° C. and 50% relative humidity. The numerical values of the surface resistivity in Table 1 are expressed using common logarithm (logarithm to the base of 10).

Evaluation-Surface Resistance

Evaluation was made according to the following criteria. The evaluation results are shown in Table 1.

Good surface resistance (◎); the post-test surface resistivity is less than $1.0\times10^{10}\Omega/\square$; normal surface resistance (○); the post-test surface resistivity is $1.0\times10^{10}\Omega/\square$ or more and less than $1.0\times10^{12}\Omega/\square$;

Poor surface resistance (×): the post-test surface resistivity is $1.0\times10^{12}\Omega/\square$ or more.

The antistatic agents and aqueous inks used in Examples and Comparative Examples are described below.

Antistatic agent A: an alkyl ammonium chloride having 15 carbon atoms in the molecule Antistatic agent B: an alkyl ammonium chloride having 21 carbon atoms in the molecule Antistatic agent C: an alkyl ammonium chloride, trade name: Antistatic Agent EXP61004, Osaka Printing Ink Manufacturing Co Ltd Aqueous white: an aqueous white ink using a urethane-based aqueous resin containing titanium oxide Aqueous varnish: aqueous transparent ink using an acrylic aqueous resin, trade name: Hydric FCG Inner OP Varnish SK-1, Dainichiseika Color & Chemicals Mfg. Co., Ltd.

REFERENCE SIGNS LIST

1 Plastic label
2 Label base material
3 Printed layer
4 Antistatic layer
10 Tubular shrink label
11 Seal portion
12 Solvent or adhesive
41 End of one end portion
42 End of the other end portion
D Circumferential direction

The invention claimed is:

1. A plastic label comprising:

a label base material, including a plastic film;

a printed layer disposed on a first surface of the label base material; and an antistatic layer disposed on a second surface the label base material, wherein the printed layer is a printed layer formed from an aqueous ink, the antistatic layer includes an antistatic agent, and the antistatic layer has a surface resistivity of less than $1.0\times10^{12}\Omega/\square$ under an atmosphere of 25° C. and 50% relative humidity after the printed layer and the antistatic layer are held in contact with each other at 0.025 MPa for 96 hours.

2. The plastic label according to claim 1, wherein the antistatic agent includes an alkyl ammonium chloride.

3. The plastic label according to claim 2, wherein the alkyl ammonium chloride has from 8 to 30 carbon atoms in a molecule.

4. The plastic label according to claim 1, wherein the aqueous ink includes an acrylic aqueous resin or a urethane-based aqueous resin.

5. A labeled container comprising:

the plastic label according to claim 1; and a container body, wherein the container body has a weight of 30 g or less, and the label is attached to the container body.

6. A method for manufacturing a labeled container, the method comprising:

preparing the plastic label according to claim 1;

attaching the plastic label to a container body; and filling a content into the container body to which the plastic label is attached.

7. The plastic label according to claim 1, wherein the plastic label is configured to form a tubular plastic label, wherein with the plastic label formed into the tubular plastic label, the antistatic layer is on an outermost surface of the tubular plastic label.

8. The plastic label according to claim 7, wherein with the plastic label formed into the tubular plastic label, the printed layer is on an innermost surface of the tubular plastic label.

* * * * *